United States Patent [19]

Lönnebring

[11] 4,452,265
[45] Jun. 5, 1984

[54] METHOD AND APPARATUS FOR MIXING LIQUIDS

[76] Inventor: Arne Lönnebring, Vagnvägen 6, S-125 33 Älvsjö, Sweden

[21] Appl. No.: 296,425

[22] PCT Filed: Dec. 22, 1980

[86] PCT No.: PCT/SE80/00346
§ 371 Date: Aug. 20, 1981
§ 102(e) Date: Aug. 20, 1981

[87] PCT Pub. No.: WO81/01803
PCT Pub. Date: Jul. 9, 1981

[30] Foreign Application Priority Data

Dec. 27, 1979 [SE] Sweden ............... 7910673-8

[51] Int. Cl.³ ................................. G05D 11/16
[52] U.S. Cl. ................................. 137/4; 137/13; 137/92
[58] Field of Search .............. 137/3, 13, 92, 4; 236/12.11, 12.12

[56] References Cited

U.S. PATENT DOCUMENTS

| 3,025,232 | 3/1962 | Jones | 137/4 |
| 3,249,115 | 5/1966 | Young | 137/92 |
| 3,383,037 | 5/1968 | Vince | 236/12.12 |
| 3,434,488 | 3/1969 | Talbot | 236/12.12 |
| 3,977,427 | 8/1976 | Reed et al. | 137/13 |

Primary Examiner—Martin P. Schwadron
Assistant Examiner—James R. Shay

[57] ABSTRACT

A substantially constant viscosity of the liquid mixture at a given temperature is maintained in mixing two liquids with different viscosities, especially diesel oil and heavy fuel oil for supply to an engine. The liquid mixture constantly being prepared in a mixer (12) is taken through a heater (23). The viscosity of the heated mixture is measured in a viscosimeter (30) adapted for controlling the heating such that a substantially constant viscosity is maintained. Furthermore, the temperature of the heated mixture is measured, and the mixing ratio between both liquids is controlled in response to the temperature so that the temperature is maintained substantially constant.

5 Claims, 1 Drawing Figure

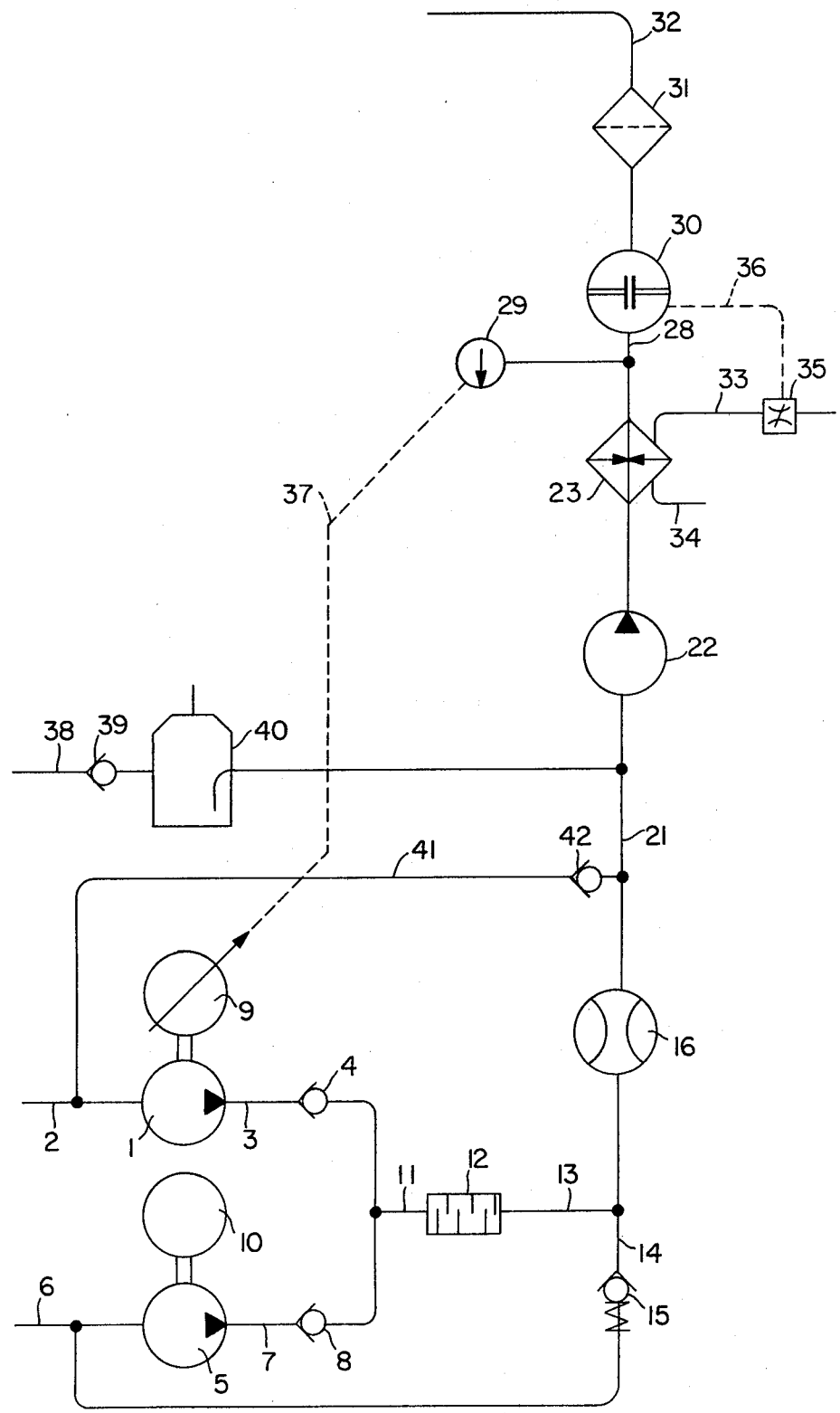

METHOD AND APPARATUS FOR MIXING LIQUIDS

DESCRIPTION

1. Technical Field

The present invention relates to a method and apparatus for mixing two liquids having different viscosities while maintaining substantially constant viscosity of the mixture. The invention particularly relates to mixing oils of different viscosity, above all mixing diesel oil with heavy fuel oil for feeding engines, e.g. auxiliary engines on vessels.

2. Background Art

With the increasing oil prices, it has become more and more imperative to reduce fuel costs for the operation of such auxiliary motors on vessels as normally run on diesel oil. For this purpose it has been proposed to mix low-class oils (heavy fuel oils) with the diesel oil for feeding such engines. Since these engines require an oil with a specific viscosity at a given temperature for their operation, it must be ensured that the mixing ratio is controlled in such a way that the appropriate viscosity is retained. For this purpose there has been proposed a system in which the mixing ratio is controlled by determining the temperature and viscosity of the mixture. The sensed values are taken to a computer unit, which converts the sensed viscosity value to the value applicable at the desired temperature, and with guidance therefrom sets the mixing ratio, e.g. by regulating the work of two pumps feeding the mixer with both oils, so that a substantially constant viscosity at the desired temperature is maintained.

This system has the drawback that the necessary computer unit is an expensive component. Furthermore the system requires use of mixing tanks. It is not possible to mix the two oils directly in a conduit leading to the engine.

The present invention intends to eliminate these drawbacks. The invention relates to a method and apparatus by which mixing step can be carried out in line without requiring the use of an expensive computer unit.

DISCLOSURE OF INVENTION

In accordance with the invention, the viscosity and temperature of the oil mixture obtained by mixing oils supplied by two pumps are sensed. The sensed viscosity is used to regulate a heater which heats the oil mixture such that a constant viscosity is maintained in the mixture departing from the heater. The sensed temperature is used for regulating the mixing ratio between the two oils such that a substantially constant temperature is maintained in the oil departing from the heater, suitably by actuating a variable pump which supplies one of the oils.

BRIEF DESCRIPTION OF DRAWING

The invention is described in detail with reference to the appended drawing, which schematically illustrates an apparatus for carrying out the method for mixing diesel oil and heavy fuel oil for supply to an engine.

BEST MODE OF CARRYING OUT THE INVENTION

The apparatus includes a diesel oil pump 1, on its suction side connected via a conduit 2 to a diesel oil tank, a conduit 3 with a non-return valve 4 departing from its pressure side, and a heavy oil pump 5, on its suction side connected via a conduit 6 to a heavy fuel oil tank, a conduit 7 with a non-return valve 8 departing from its pressure side. The diesel oil pump 1 is driven by a motor 9 at a variable of rate rotation, and the heavy oil pump 5 is driven by a motor 10 at a constant rate of rotation.

Both conduits 3, 7 are taken to a conduit 11 opening out in a mixer 12, in which the diesel oil and the heavy fuel oil are mixed. The mixture departs via a conduit 13, from which a return conduit 14 with non-return valve 15 goes to the conduit 6 on the suction side of the pump 5, so that a portion of the oil mixture returns to the pump 5, this pump thus operating with a mixture of newly supplied heavy fuel oil and oil mixture already produced.

The portion of the oil mixture which is not recycled flows first through a flow meter 16. The mixture is then transported via a conduit 21 by a pump 22 for taking the mixture through a heater 23. The mixture flowing from the heater 23 passes through a conduit 28. In this conduit the temperature of the mixture is measured by a thermometer 29, and its viscosity by means of a viscosimeter 30. The mixture is then taken via a filter 31 to the point of consumption, e.g. a diesel engine (not shown), via a conduit 32.

In the illustrated example, the oil mixture is heated in the heater 23 by means of steam supplied via a conduit 33, while the condensate is taken off via a conduit 34. A variable constriction 35 is inserted in the conduit 33 and its setting is controlled by the viscosimeter 30, as indicated by the line 36. The temperature read by the thermometer 29 serves for setting the variable motor 9, as indicated by the line 37.

The system operates in the following way. If the mixture viscosity at the viscosimeter 30 tends to increase, a signal is sent increasing the steam supply at the constriction 35, whereby heating in the heater 23 increases and the temperature read by the thermometer 29 increases. A signal is thereby given to the motor 9, which has its rate of rotation increased so that the pump supplies a greater amount of diesel oil, and the mixture viscosity decreases. If instead, the viscosity at the viscosimeter 30 tends to decrease, the steam supply to the heater 23 is restricted whereby the temperature read by the thermometer 29 drops and the motor 9 is caused to operate at a lower rate of rotation, so that the admixture of diesel oil decreases. Thus, a mixture of substantially constant viscosity and substantially constant temperature is taken to the engine.

A conduit 38 takes the return oil mixture from the diesel engine which is being supplied via a non-return valve 39 and an air bleed 40 to the suction side of the pump 22.

A conduit 41 with non-return valve 42 goes from the conduit 2 directly to the conduit 21. This makes it possible to supply the engine solely with diesel oil if needed, e.g. in case of disturbances in the mixing system.

I claim:

1. A method of mixing liquids with different viscosities while retaining substantially constant viscosity at a given temperature of the liquid mixture, characterized in that the mixture is heated, in that its temperature and viscosity after heating are measured, in that heating is regulated with guidance from the thus-determined viscosity, so that a substantially constant viscosity value after heating is maintained, and in that the mixing ratio between both liquids is regulated with guidance from the measured temperature, so that a substantially constant temperature of the liquid mixture is maintained after heating.

2. Method as claimed in claim 1, characterized in that one liquid is supplied in a constant flow and that the mixing ratio is regulated by controlling the flow of the other liquid.

3. Apparatus for mixing two liquids with different viscosities while retaining substantially constant viscosity at a given temperature of the liquid mixture, comprising pumps (1, 5) for continuous supply of both liquids to a continuously working mixer (12), characterized by a heater (23) for heating the liquid mixture comming from the mixer (12), by a viscosimeter (30) adapted for measuring the viscosity of the heated liquid mixture, and controlling the heater (23) so that a substantially constant viscosity is obtained, and by a thermometer (29) arranged for measuring the temperature of the heated mixture, and controlling the operation of the pumps or one of the pumps so that a substantially constant temperature is maintained.

4. Apparatus as claimed in claim 3, characterized in that the pump (5) is adapted for operation at constant flow for supplying the liquid with higher viscosity, and that the pump (1) for supplying liquid of a low viscosity is adapted for operating with variable flow and being controlled by the thermometer (29).

5. Apparatus as claimed in claim 4, characterized by a return conduit (14) for recycling a portion of the liquid mixture from the outlet of the mixture (12) to the suction side of the constant flow pump (5).

* * * * *